(12) United States Patent
Lee et al.

(10) Patent No.: US 11,252,408 B2
(45) Date of Patent: Feb. 15, 2022

(54) IMAGE PROCESSING APPARATUS AND DATA RECEIVING APPARATUS, AND METHODS THEREOF

(71) Applicant: Ulsan National Institute of Science and Technology, Ulsan (KR)

(72) Inventors: Kyunghan Lee, Ulsan (KR); Wooseung Nam, Ulsan (KR)

(73) Assignee: Ulsan National Institute of Science and Technology, Ulsan (KR)

( * ) Notice: Subject to any disclaimer, the term of this patent is extended or adjusted under 35 U.S.C. 154(b) by 144 days.

(21) Appl. No.: 16/704,069

(22) Filed: Dec. 5, 2019

(65) Prior Publication Data
US 2020/0186797 A1    Jun. 11, 2020

(30) Foreign Application Priority Data
Dec. 7, 2018    (KR) ......................... 10-2018-0157080

(51) Int. Cl.
*H04N 19/115*    (2014.01)
*G06K 9/62*    (2022.01)

(52) U.S. Cl.
CPC ......... *H04N 19/115* (2014.11); *G06K 9/6215* (2013.01); *G06K 9/6223* (2013.01); *G06K 9/6276* (2013.01)

(58) Field of Classification Search
CPC .. H04N 19/115; G06K 9/6215; G06K 9/6223; G06K 9/6276
USPC ....................................................... 382/209
See application file for complete search history.

(56) References Cited

U.S. PATENT DOCUMENTS

| 6,049,632 A | * | 4/2000 | Cockshott | ............ | H04N 19/105 |
| | | | | | 382/239 |
| 2012/0201462 A1 | * | 8/2012 | Chang | .................. | H04N 19/147 |
| | | | | | 382/190 |
| 2016/0073133 A1 | * | 3/2016 | Lee | ....................... | H04N 19/593 |
| | | | | | 375/240.12 |
| 2018/0124456 A1 | * | 5/2018 | Terrazas | ........... | H04N 21/42201 |
| 2018/0262754 A1 | * | 9/2018 | Komi | .................. | H04N 19/176 |

OTHER PUBLICATIONS

Wooseung Nam, Joohyun Lee, Kyunghan Lee. "SyncCoding: A Compression Technique Exploiting References for Data Synchronization Services." 2017 IEEE 25th International Conference on Network Protocols. Oct. 13, 2017. 12 pages.

* cited by examiner

*Primary Examiner* — Michael R Neff
(74) *Attorney, Agent, or Firm* — Maier & Maier, PLLC

(57) ABSTRACT

An image processing apparatus includes a storage unit, a selection unit, and an encoding unit. The storage unit stores pre-synchronized image data. The selection unit selects as a reference image at least one of the pre-synchronized image data based on a result of comparison between the pre-synchronized image data and an original image data. The encoding unit generates a compressed image data by compressing the original image data using the reference image. The selection unit calculates similarity between the original image data and at least one of the pre-synchronized image data and selects the reference image among the synchronized image data based on the calculated similarity.

17 Claims, 5 Drawing Sheets

IMAGE PROCESSING APPARATUS AND DATA RECEIVING APPARATUS, AND METHODS THEREOF

CROSS-REFERENCE TO RELATED APPLICATIONS

This application claims priority to Korean Patent Application No. 10-2018-0157080 filed on Dec. 7, 2018, the entire contents of which are incorporated herein by reference.

FIELD

The present disclosure relates to an image processing apparatus, a data receiving apparatus, and methods thereof and; more particularly, to an image processing apparatus for compressing image data, a data receiving apparatus for receiving a compressed image data, and methods thereof. For reference, the present disclosure was in part supported by IITP grants funded by the Korea government (MSIT) (No. 2017-0-00667, Research on Information-Coordination Technique Enabling Augmented Reality with Mobile Objects).

BACKGROUND

In order to efficiently exchange information in network communication, it is required to ensure a high information transmission/reception speed. In order to improve the information transmission/reception speed, it is required to increase a bandwidth of a network or to increase a data compression rate of information.

In a network communication system having a limited bandwidth, such as an underwater communication environment, a satellite communication environment, or the like, it is required to increase the data compression rate to ensure the high information transmission/reception speed. Further, in a storage system such as a cloud, a distributed system, or the like, it is required to increase the data compression rate to efficiently utilize a storage capacity.

As an example of the data compression, a conventional image compression technique generates compressed image data by eliminating spatial redundancy in an image to be compressed. For example, a video signal is generated by continuously capturing the same background and, thus, a lot of duplicate data exist between a previous video frame and a current video frame. Therefore, the size of the video signal can be reduced in the case of storing only information on a part different from the previous video frame, compared to the case of storing all the information on the current video frame. At this time, it is required to compress the current video frame so that it can be restored from the information on the part different from the previous video frame.

However, in the conventional technique (see, e.g., Korean Patent No. 2012-0003909 (Published on Jan. 11, 2012)), the compressed image data is generated using only redundancy elimination in an image to be compressed and, thus, there is a limit in improving the compression rate of the image data.

SUMMARY

In view of the above, the present disclosure provides an image processing apparatus using pre-synchronized (pre-stored or pre-transmitted) image data for compression of original image data, and a method thereof.

An image processing apparatus includes a storage unit in which pre-synchronized image data is stored; a selection unit configured to select as a reference image at least one of the pre-synchronized image data based on a result of comparison between the pre-synchronized image data and an original image data; and an encoding unit configured to generate a compressed image data by compressing the original image data using the reference image.

Further, the selection unit may calculate similarity between the original image data and at least one of the pre-synchronized image data and select the reference image among the synchronized image data based on the calculated similarity.

Further, the selection unit may classify the pre-synchronized image data into a plurality of reference image set candidate groups, select at least one of the reference image set candidate groups based on a result of comparison between the reference image set candidate groups and the original image data, calculate the similarity between the original image data and image data included in the selected at least one of the reference image set candidate groups, and select as the reference image at least one of the image data included in the selected at least one of the reference image set candidate groups based on the calculated similarity.

Further, the selection unit may classify the pre-synchronized image data into the reference image set candidate groups using a K-means clustering algorithm or a K-nearest neighbors algorithm based on image features or using a data clustering technique for tagging the pre-synchronized image data.

Further, the selection unit may calculate similarity between the original image data and at least one of the pre-synchronized image data using a technique for calculating color differences between pixels at the same position in the images and determining that the smaller a sum of the color differences between the images is, the more similar the images are, similarity by extracting and comparing image features including contours and color characteristics between images, a technique for calculating similarity based on cosine similarity between distribution vectors using color distribution between images, and a technique for calculating similarity based on a matching rate of bit streams between images.

The image processing apparatus may further include include a data processing unit configured to store the compressed image data generated by the encoding unit in the storage unit. The selection unit may request the data processing unit to protect the reference image, and the data processing unit may protect the reference image to be used by the encoding unit in response to the protection request of the selection unit.

Further, if a deletion request event for the reference image occurs, the data processing unit may allow the image data, which is compressed using the reference image whose deletion has been requested, to use another reference image.

Further, the encoding unit may compress the original image data to reduce redundancy between the reference image and the original image data.

The image processing apparatus may further include a transmitting unit configured to transmit information on the reference image to a reception side.

Further, the encoding unit may generate a reference list data including information of the reference image used for compressing the original image data, and the transmitting unit may transmit the reference list data as the information on the reference image to the reception side.

The present disclosure further provides a data receiving apparatus for receiving image data compressed using pre-synchronized image data and restoring the compressed image data to an original image data, and a method thereof.

A data receiving apparatus includes a storage unit in which pre-synchronized image data is stored; a receiving unit configured to receive the information on a reference image set used for generating compressed image data by compressing original image data and the compressed image data; and a decoding unit configured to extract at least one of the pre-synchronized image data based on the information on the reference image set and restore the compressed image data to the original image data using the extracted image data.

Further, the receiving unit may receive reference list data including information on the reference image set used for compression of the original image data, and the decoding unit extracts the reference image set corresponding to the reference list data from the storage unit and restores the original image data using the extracted reference image set.

An image processing method performed by an image processing apparatus, includes selecting as a reference image at least one of pre-synchronized image data based on a result of comparison between the pre-synchronized image data and an original image data; and generating a compressed image data by compressing the original image data using the reference image.

Further, in said selecting, similarity between the original image data and the pre-synchronized image data may be calculated and the reference image may be selected from the pre-synchronize image data based on the calculated similarity.

Further, in said selecting, the pre-synchronized image data may be classified into a plurality of reference image set candidate groups; at least one of the reference image set candidate groups may be selected based on a result of comparison between the plurality of the reference image set candidate groups and the original image data; the similarity between the original image data and image data included in the selected at least one of the reference image set candidate groups may be calculated; and at least one of the image data included in the selected at least one of the reference image set candidate groups may be selected as the reference image based on the calculated similarity.

Further, in said selecting, the pre-synchronized image data may be classified into the reference image set candidate groups using a K-means clustering algorithm or a K-nearest neighbors algorithm based on image features, or using a data clustering technique for tagging the pre-synchronized image data.

Further, in said selecting, the similarity between the original image data and the pre-synchronized image data may be calculated using one or more techniques for calculating similarity between images among a technique for for calculating color differences between pixels at the same position in the images and determining that the smaller a sum of the color differences between the images is, the more similar the images are, a technique for calculating similarity by extracting and comparing image features including contours and color characteristics between images, a technique for calculating similarity based on cosine similarity between distribution vectors using color distribution between images, and a technique for calculating similarity based on a matching rate of bit streams between images.

The image processing method may further include protecting the reference image to be used for generating the compressed image data.

Further, in said protecting, if a deletion request event for the reference image occurs, another reference image may be used by the image data compressed using the reference image whose deletion has been requested.

Further, in said generating the compressed image data, the original image data may be compressed to reduce redundancy between the reference image and the original image data.

The image processing method may further include transmitting information on the reference image to a reception side.

The image processing method may further include generating reference list data including information of the reference image used for compressing the original image data, wherein in said transmitting, the compressed image data and the reference list data are transmitted to the reception side.

A data reception method performed by a data reception apparatus, includes receiving information on a reference image used for generating a compressed image data by compressing an original image data and the compressed image data; and extracting at least one of pre-synchronized image data based on the information on the reference image and restoring the compressed image data to the original image data using the extracted image data.

Further, said receiving information may further includes receiving a reference list data including information on a reference image set used for compressing the original image data, and wherein in said restoring, the reference image set corresponding to the reference list data may be extracted from the pre-synchronized image data, and the original image data may be restored using the extracted reference image set.

A computer-readable storage medium storing a computer program for causing a processor to perform an image processing method includes selecting as a reference image at least one of pre-synchronized image data based on a result of comparison between the pre-synchronized image data and an original image data; and generating a compressed image data by compressing the original image data using the reference image.

The technical problems to be solved by the present disclosure are not limited to the aforementioned drawbacks, and other technical problems that are not mentioned will be clearly understood by those skilled in the art.

In accordance with an embodiment of the present disclosure, pre-synchronized image data is used for compression of an original image data. In other words, a compression ratio of the image data can be improved by eliminating redundancy between images that are not temporally continuous, compared to the case of generating compressed image data using only redundancy elimination in an image to be compressed. Further, the present disclosure provides a high-speed searching method capable of quickly searching and selecting a reference image in a data center or a large-scaled storage system.

BRIEF DESCRIPTION OF THE DRAWINGS

The objects and features of the present disclosure will become apparent from the following description of embodiments, given in conjunction with the accompanying drawings, in which.

DETAILED DESCRIPTION

The advantages and features of embodiments and methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
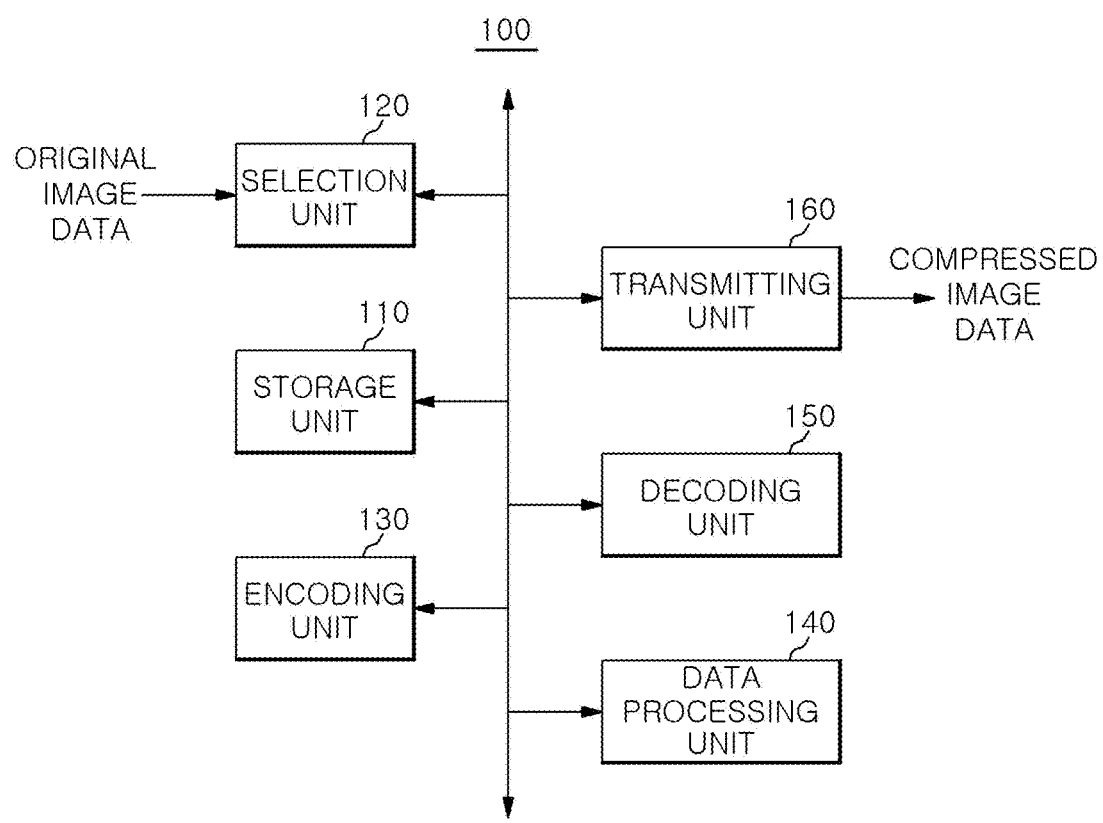
FIG. 1 is a block diagram of an image processing apparatus according to an embodiment of the present disclosure.
Figure 2:
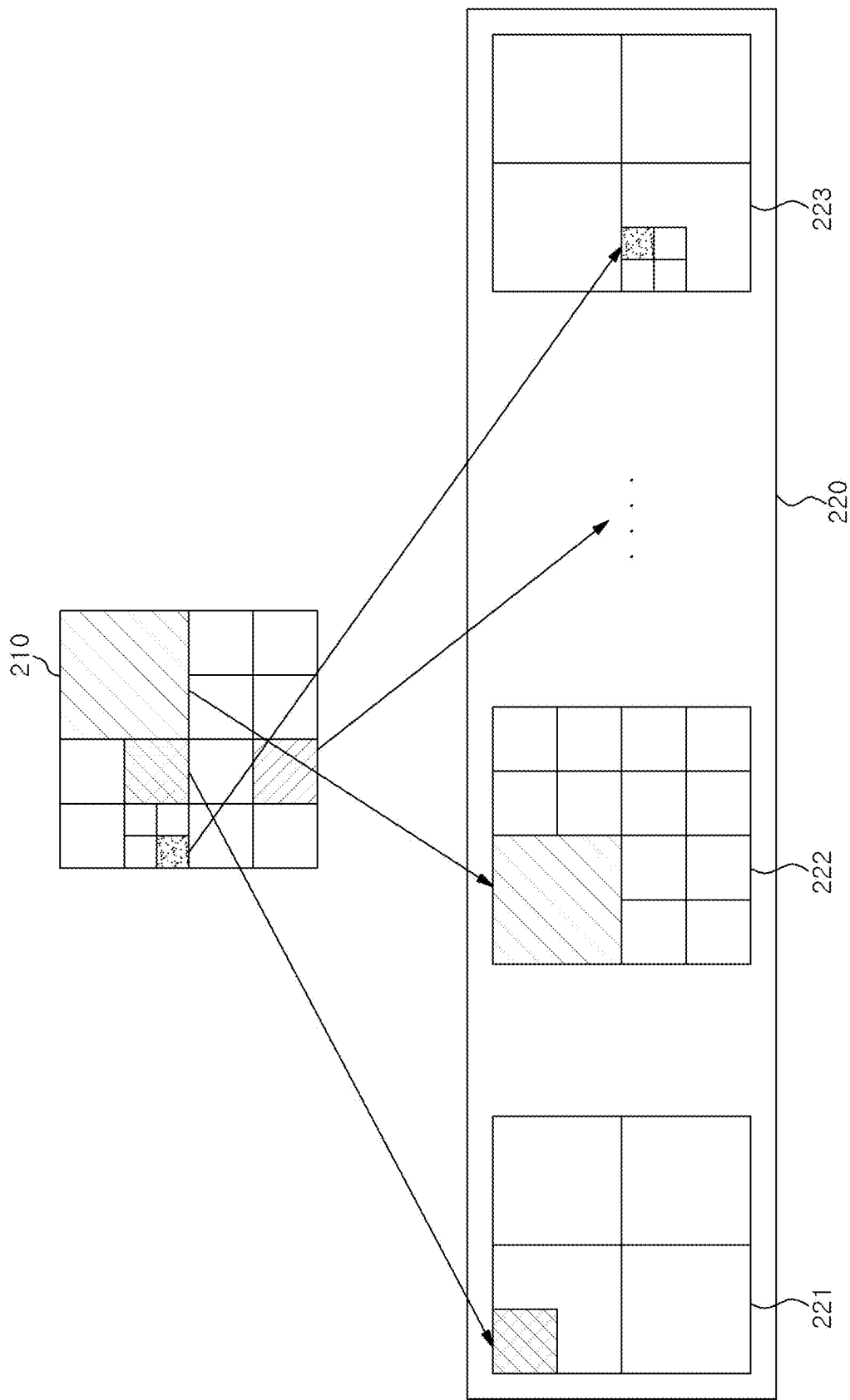
FIG. 2 is a conceptual diagram of an image data compression process performed by the image processing apparatus according to the embodiment of the present disclosure.

FIG. 1 is a block diagram of an image processing apparatus 100 according to an embodiment of the present disclosure. FIG. 2 is a conceptual diagram of an image data compression process performed by the image processing apparatus 100 according to the embodiment of the present disclosure.

As shown in FIG. 1, an image processing apparatus 100 according to an embodiment includes a storage unit 110, a selection unit 120, an encoding unit 130, a data processing unit 140, a decoding unit 150, and a transmitting unit 160. Here, the decoding unit 150 and the transmitting unit 160 may be omitted if the image processing apparatus 100 serves as a storage device having a function of storing a compressed image data. The decoding unit 150 may be included if the image processing apparatus 100 serves as a storage/reproduction device having a function of restoring a compressed image data to an original image data and reproducing the original image data. The transmitting unit 160 may be included if the image processing apparatus 100 serves as a data transmitting device having a function of transmitting a compressed image data to a reception side. For example, the storage unit 110 may be a cloud storage, or may be formed as one unit with a storage unit 310 of a data receiving apparatus 300 shown in in FIG. 3. For example, the storage unit 110 may include a computer-readable recording medium. The recording medium may be a hardware device configured to store and execute program commands, such as a magnetic medium, e.g., a hard disk, a floppy disk, or a magnetic tape, an optical medium, e.g., a CD-ROM or a DVD, a magneto-optical medium, e.g., a floptical disk, a flash memory, or the like. For example, the selection unit 120, the encoding unit 130, the data processing unit 140, and the decoding unit 150 may include an operation unit such as a microprocessor or the like.

The storage unit 110 stores pre-synchronized image data. The pre-synchronized image data may indicate image data that is previously stored in the storage unit 110 or image data that is previously transferred by the transmission unit 150. For example, the pre-synchronized image data may be compressed image data or original image data.

When the original image data is inputted and a compression request event occurs, the selection unit 120 compares the inputted original image data with the pre-synchronized image data stored in the storage unit 110, selects, as a reference image, one or more image data among the pre-synchronized image data stored in the storage unit 110 based on the comparison result, and requests the data processing unit 140 to protect the selected reference image. Here, the compression request event may be inputted to the image processing apparatus 100 through a user interface (not shown). For example, the user interface may be a touch screen device having a screen output function and an information input function. For example, the selection unit 120 can calculate similarity between the original image data and one or more image data among the pre-synchronized image data stored in the storage unit 110 and select, as the reference image, a specific image data among the pre-synchronized image data based on the calculated similarity.

Here, the selection unit 120 can calculate the similarity between the original image data and one or more image data among the pre-synchronized image data using one or more techniques for calculating similarity between images among a technique for calculating color differences between pixels at the same position in the images and determining that the smaller a sum of the color differences between the images is, the more similar the images are, a technique for calculating similarity by extracting and comparing image features including contours and color characteristics between images, a technique for calculating similarity based on cosine similarity between distribution vectors using color distribution between images, and a technique for calculating similarity based on a matching rate of bit streams between images.

Further, the selection unit 120 can classify the pre-synchronized image data into a plurality of reference image set candidate groups. For example, the selection unit 120 can classify the pre-synchronized image data into the reference image set candidate groups using a K-means clustering algorithm or a K-nearest neighbors algorithm based on image features. Alternatively, the selection unit 120 can classify the pre-synchronized image data into the reference image set candidate groups using a data clustering technique for tagging the pre-synchronized image data.

Further, the selection unit 120 can select at least one of the reference image set candidate groups based on the result of comparison between the image features of the reference image set candidate groups and those of the original image data.

Then, the selection unit 120 can calculate the similarity between the image data included in the selected one reference image set candidate group and the original image data and select as the reference image at least one of the image data included in the selected one reference image set candidate group based on the calculated similarity. For example, the selection unit 120 can select a plurality of reference images 221, 222, and 223 from the selected one reference image set candidate group 220 with respect to the original image data 210 and generate a reference list data including mapping information on a specific area of the original image data 210 and a specific area of the reference images 221, 222, and 223.

The encoding unit 130 generates a compressed image data by compressing the original image data using the reference image selected by the selection unit 120. Here, the encoding unit 130 can compress the original image data so that the redundancy between the reference image and the original image data can be eliminated. Then, the encoding unit 130 generates the reference list data including the information on the reference image used for compressing the original image data. For example, the reference list data may include identification information of the reference image corresponding to identification information of the compressed image data.

The data processing unit 140 stores the compressed image data generated by the encoding unit 130 in the storage unit 110. When a deletion request event for the selected reference image occurs, a reference change process in which another reference image is used by an image data compressed using a reference image whose deletion has been requested is performed and, then, the reference image that is a target of the deletion request event can be deleted from the storage unit 110. For example, the data processing unit 140 can perform the reference change process immediately after the occurrence of the deletion request event for the reference image, and then delete the reference image. Alternatively, the data processing unit 140 can perform the reference change process and delete the reference image after the deletion request event for the reference image is identified at a preset cycle. For example, the delete request event for the selected reference image can be inputted to the image processing apparatus 100 through a user interface (not shown). For example, the user interface may be a touch screen device having a screen output function and an information input function.

When a restoration request event for the pre-synchronized image data occurs, the decoding unit 150 extracts the compressed image data from the storage unit 110, identifies the reference image corresponding to the extracted compressed image based on the reference list data, and restores the compressed image data to the original image data using the extracted compressed image data and the identified reference image. For example, a restoration request event for a specific compressed image data can be inputted to the image processing apparatus 100 through the user interface (not shown).

The transmitting unit 160 transmits the compressed image data and the reference image list generated by the encoding unit 130 to the reception side.

Figure 3:
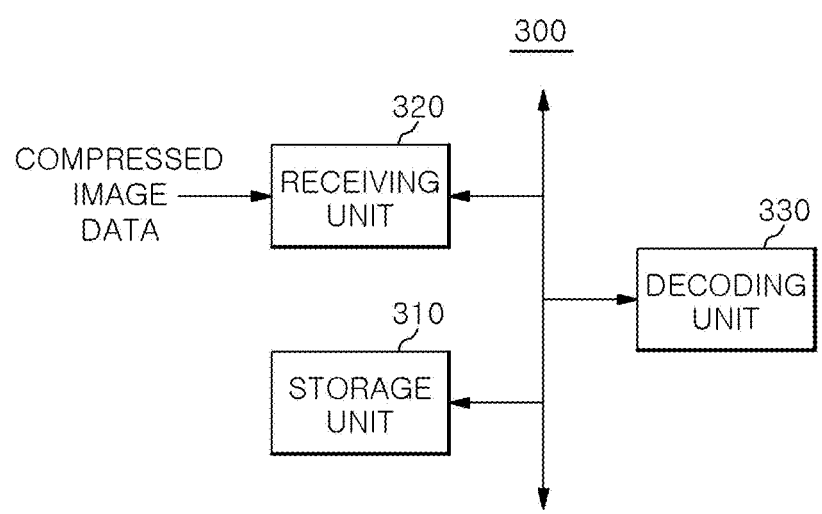
FIG. 3 is a block diagram of a data receiving apparatus according to another embodiment of the present disclosure.

FIG. 3 is a block diagram of a data receiving apparatus according to another embodiment of the present disclosure.

As shown in FIG. 3, the data receiving apparatus 300 according to another embodiment may include a storage unit 310, a receiving unit 320, and a decoding unit 330. For example, the storage unit 310 may be a cloud storage or may be formed as one unit with the storage unit 110 of the image processing apparatus 100 shown in FIG. 1. For example, the storage unit 310 may include a computer-readable recording medium. The recording medium may be a hardware device configured to store and execute program commands, such as a magnetic medium, e.g., a hard disk, a floppy disk, or a magnetic tape, an optical medium, e.g., a CD-ROM or a DVD, a magneto-optical medium, e.g., a floptical disk, a flash memory, or the like. For example, the decoding unit 150 may include an operation unit such as a microprocessor or the like.

The storage unit 310 stores the pre-synchronized image data. The pre-synchronized image data may indicate the compressed image data transmitted in a compressed state by the image processing apparatus 100 shown in FIG. 1.

The receiving unit 320 receives the information on the reference image and the compressed image data transmitted by the image processing apparatus 100 shown in FIG. 1. For example, the receiving unit 320 can receive, as the information on the reference image, the reference list data including the mapping information on the specific area of the original image data and the specific areas of the reference images.

When the restoration request event occurs, the decoding unit 330 extracts as the reference image at least one of the pre-synchronized image data in the storage unit 310 based on the information on the reference image received by the receiving unit 320, and restores the compressed image data to the original image data using the extracted image data. For example, the decoding unit 330 can extract a reference image set corresponding to the reference list data from the storage unit 310 and restore the compressed image data to the original image data using the extracted reference image set. Here, the restoration request event can be inputted to the data receiving apparatus 300 through a user interface (shown). For example, the user interface may be a touch screen device including a screen output function and an information input function.

Figure 4:
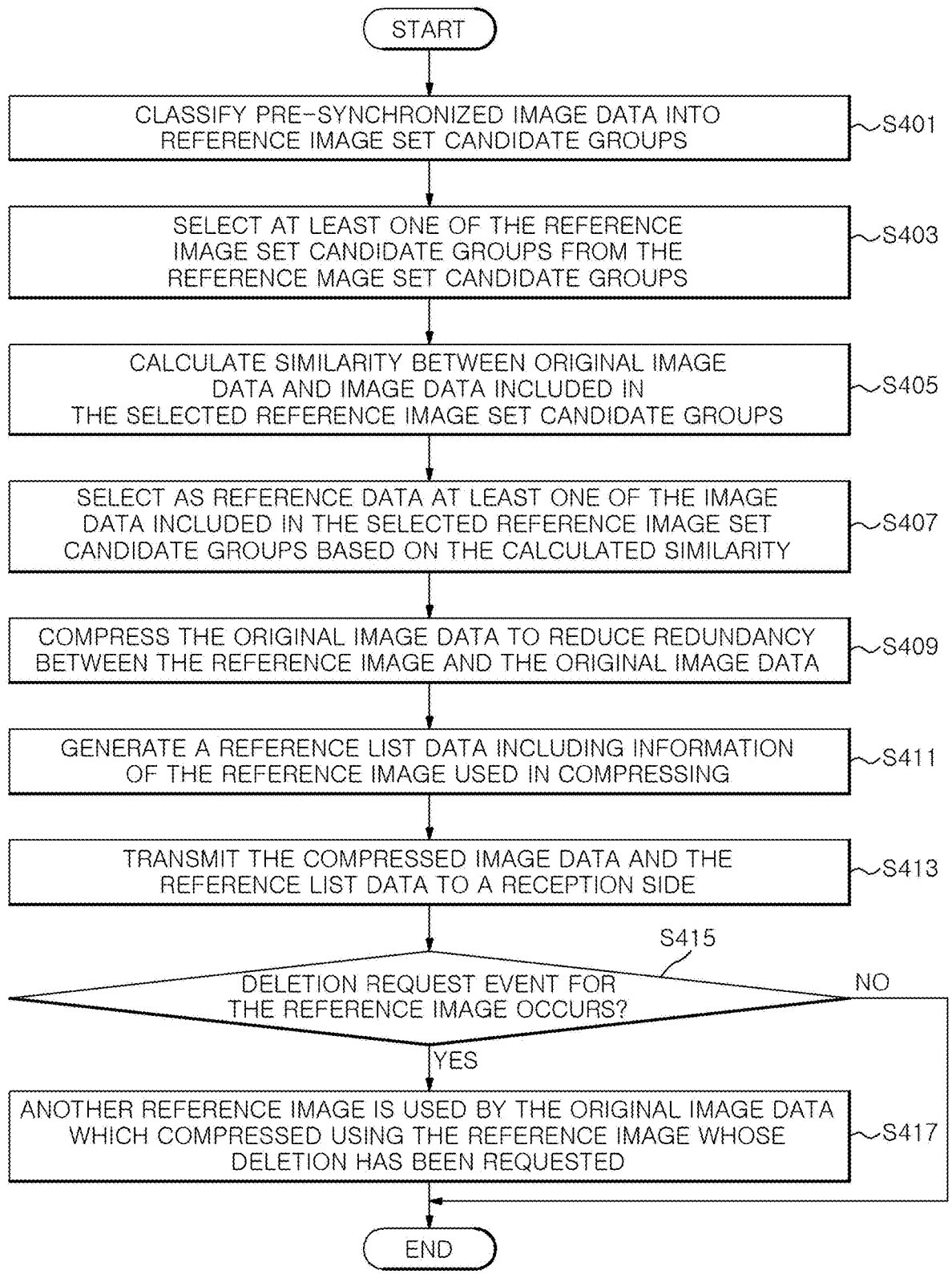
FIG. 4 is a flowchart for explaining an image processing method performed by the image processing apparatus shown in FIG. 1.
Figure 5:
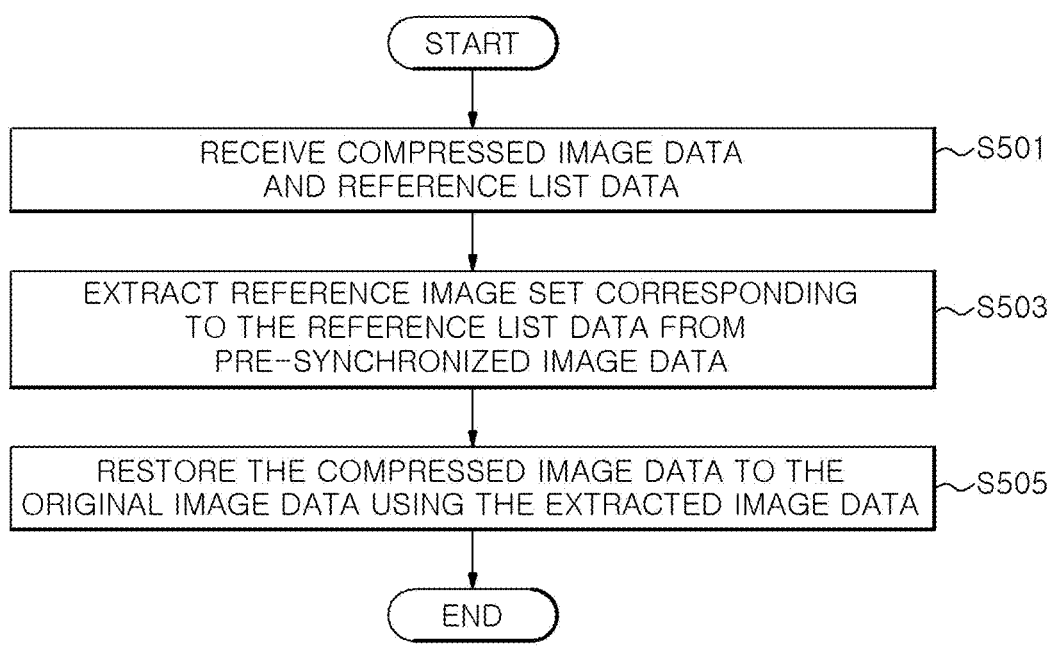
FIG. 5 is a flowchart for explaining a data receiving method performed by the data receiving apparatus shown in FIG. 3.

FIG. 4 is a flowchart for explaining an image processing method performed by the image processing apparatus shown in FIG. 1. FIG. 5 is a flowchart for explaining a data reception method performed by the data receiving apparatus shown in FIG. 3.

Hereinafter, a process in which the image processing apparatus 100 generates a compressed image data by compressing the original image data and transmits the compressed image data and the data receiving apparatus 300 receives the compressed image data from the image processing apparatus 100 and restores the compressed image data to the original image data will be described as an example with reference to FIGS. 1 to 5.

When the original image data is inputted to the image processing apparatus 100 and the compression request event occurs, the image processing apparatus 100 can generate compressed image data by compressing the original image data and store the compressed image data or transmit the generated compressed image data to the data receiving apparatus 300. Therefore, the selection unit 120 can classify the pre-synchronized image data stored in the storage unit 110 into a plurality of reference image set candidate groups. For example, the selection unit 120 can classify the pre-synchronized image data into the reference image set candidate groups using a K-means clustering algorithm or a K-nearest neighbors algorithm based on the image features. Alternatively, the selection unit 120 can classify the pre-synchronized image data into the reference image set candidate groups using a data clustering technique for tagging the pre-synchronized image data (step S401).

Further, the selection unit 120 can select at least one of the reference image set candidate groups based on the result of comparison between the image features of the original image data and those of the reference image set candidate groups classified in the step S401 (step S403).

Next, the selection unit 120 can calculate similarity between the original image data and the image data included in at least one of the reference image set candidate groups selected in the step S403. For example, the selection unit 120 can calculate the similarity between the original image data and at least one of the pre-synchronized image data using one or more techniques for calculating similarity between images among a technique for calculating color differences between pixels at the same position in the images and determining that the smaller a sum of the color differences between the images is, the more similar the images are, a technique for calculating similarity by extracting and comparing image features including contours and color characteristics between images, a technique for calculating similarity based on cosine similarity between distribution vectors using color distribution between images, and a technique for calculating similarity based on a matching rate of bit streams between images (S405).

Further, the selection unit 120 can select as the reference data at least one of the image data included in the selected at least one of reference image set candidate groups based on the similarity calculated in the step S405 and generate the reference list data (step S407).

In the steps S401 and S403, the pre-synchronized image data in the storage unit 110 is classified into a plurality of reference image set candidate groups and, then, one reference image set candidate group is selected. This is because if the step S405 and step S407 are executed without executing the steps S401 and S403, all the image data stored in the storage unit 110 can be reference image candidates. In that case, a long period of time is required to compare the images. By reducing the number of reference image candidates, the reference image can be selected within a relatively shorter period of time.

Next, the encoding unit 130 generates a compressed image data by compressing the original image data using the reference image selected in the step S407 by the selection unit 120. Here, the encoding unit 130 can compress the original image data so that the redundancy between the reference image and the original image data is reduced. For example, the encoding unit 130 can generate the compressed image data by eliminating the specific area of the original image data 210 corresponding to the specific areas of the reference images 221, 222, and 223 (step S409).

Then, the encoding unit 130 generates a reference list data including identification information of the reference image corresponding to the identification information of the compressed image data. For example, the encoding unit 130 can generate the reference list data including mapping information of the specific area of the original image data 210 corresponding to the specific areas of the reference images 221, 222, and 223 (step S411).

The transmitting unit 160 can transmit the compressed image data generated in the step S409 and the reference list data generated in the step S411 to the data receiving apparatus 300 (step S413).

If the restoration request event for the pre-synchronized image data occurs, the decoding unit 150 can extract the compressed image data from the storage unit 110, identify the reference image corresponding to the extracted compressed image data based on the reference list data generated in the step S411 by the encoding unit 130, and restore the compressed image data to the original image data using the extracted compressed image data and the identified reference image. If the corresponding reference image was deleted from the storage unit 110 due to the deletion request event for the reference image selected in the step S407, the decoding unit 150 cannot restore the original image data. In order to prevent the case in which the decoding cannot be performed, the selection unit 120 can select the reference image in the step S407, and then request the data processing unit 140 to protect the reference image.

If the protection request for the reference image occurs, the data processing unit 140 can protect the reference image selected in the step S407 so that it can be used by the encoding unit 130. In the reference image protection mode, if the deletion request event for the reference image occurs (step S415), the data processing unit 140 can perform the reference change process in which another reference image is used by the image data compressed using the reference image whose deletion has been requested, and then delete the reference image that is a target of the deletion request event from the storage unit 110 (step S417) For example, the data processing unit 140 can perform the reference change process immediately after the occurrence of the deletion request event for the reference image, and then delete the reference image. Alternatively, the data processing unit 140 can perform the reference change process and delete the reference image after the deletion request event for the reference image is identified at a pre-set cycle. When the data processing unit 140 operates in the reference image protection mode, a copy of the reference image selected in the step S407 is generated and stored in the storage unit 110 so that the encoding unit 130 can use the reference image anytime to restore the compressed image data to the original image data.

The compressed image data and the reference list data transmitted in the step S413 may be received by the receiving unit 320 of the data receiving apparatus 300 and stored in the storage unit 310.

If the restoration request event occurs, the decoding unit 330 of the data receiving apparatus 300 extracts as the reference image at least one of the pre-synchronized image data in the storage unit 310 based on the reference list data received in the step S501 (step S503).

Then, the decoding unit 330 restores the compressed image data to the original image data using the image data extracted as the reference image in the step S503. For example, the decoding unit 330 can extract the reference image set corresponding to the reference list data from the storage unit 310 and restore the compressed image data to the original image data using the extracted reference image set corresponding to the reference list data. For example, the decoding unit 330 can restore the original image data 210 by mapping the specific areas of the reference images 221, 222, and 223 on the specific area of the compressed image data corresponding thereto (step S505).

In accordance with the above-described embodiment of the present disclosure, the pre-synchronized image data is used for compressing the original image data. In other words, by eliminating redundancy between images that are not temporally continuous, a compression ratio of image data is improved compared to the case of generating a compressed image data using only redundancy elimination in an image to be compressed.

Combinations of blocks in the flowcharts of the present disclosure can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the steps of the flowchart. These computer program instructions may also be stored in a computer usable or computer readable memory that can direct a computer or other programmable data processing apparatuses to function in a particular manner, such that the instructions stored in the computer usable or computer readable medium can produce an article of manufacture including instructions which implement the function specified in the blocks of the flowcharts. The computer program instructions may also be loaded onto a computer or other programmable data processing apparatuses to cause a series of operational steps to be performed on the computer or other programmable apparatuses to produce a computer implemented process such that the instructions which execute on the computer or other programmable apparatuses provide processes for implementing the functions specified in the blocks of the flowcharts.

Each block in the flowchart may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. An image processing apparatus comprising:
   a storage unit in which pre-synchronized image data is stored;
   a selection unit configured to select, as a reference image, at least one of the pre-synchronized image data based on a result of a comparison between the pre-synchronized image data and an original image data;
   an encoding unit configured to generate a compressed image data by compressing the original image data using the reference image;
   a data processing unit configured to store the compressed image data generated by the encoding unit in the storage unit,
   wherein the selection unit requests the data processing unit to protect the reference image, and
   the data processing unit protects the reference image to be used by the encoding unit in response to the protection request of the selection unit.

2. The image processing apparatus of claim 1, wherein the selection unit calculates similarity between the original image data and at least one of the pre-synchronized image data and selects the reference image among the synchronized image data based on the calculated similarity.

3. The image processing apparatus of claim 2, wherein the selection unit classifies the pre-synchronized image data into a plurality of reference image set candidate groups, selects at least one of the reference image set candidate groups based on a result of a comparison between the reference image set candidate groups and the original image data, calculates the similarity between the original image data and image data included in the selected at least one of the reference image set candidate groups, and selects, as the reference image, at least one of the image data included in the selected at least one of the reference image set candidate groups based on the calculated similarity.

4. The image processing apparatus of claim 3, wherein the selection unit classifies the pre-synchronized image data into the reference image set candidate groups using a K-means clustering algorithm or a K-nearest neighbors algorithm based on image features or using a data clustering technique for tagging the pre-synchronized image data.

5. The image processing apparatus of claim 2, wherein the selection unit calculates similarity between the original image data and at least one of the pre-synchronized image data using a technique for calculating color differences between pixels at the same position in the images and determining that the smaller a sum of the color differences between the images is, the more similar the images are, similarity by extracting and comparing image features including contours and color characteristics between images, a technique for calculating similarity based on cosine similarity between distribution vectors using color distribution between images, and a technique for calculating similarity based on a matching rate of bit streams between images.

6. The image processing apparatus of claim 1, wherein if a deletion request event for the reference image occurs, the data processing unit allows the image data, which is compressed using the reference image whose deletion has been requested, to use another reference image.

7. The image processing apparatus of claim 1, wherein the encoding unit compresses the original image data to reduce redundancy between the reference image and the original image data.

8. The image processing apparatus of claim 1, further comprising:
   a transmitting unit configured to transmit information on the reference image to a reception side.

9. The image processing apparatus of claim 8, wherein the encoding unit generates a reference list data including information of the reference image used for compressing the original image data, and
   the transmitting unit transmits the reference list data as the information on the reference image to the reception side.

10. A data receiving apparatus comprising:
    a storage unit in which pre-synchronized image data is stored;
    a receiving unit configured to receive compressed image data and information on a reference image set used for generating the compressed image data by compressing original image data; and
    a decoding unit configured to extract at least one of the pre-synchronized image data based on the information on the reference image set and restore the compressed image data to the original image data using the extracted image data,
    wherein the pre-synchronized image data is classified into a plurality of reference image set candidate groups using a K-means clustering algorithm or a K-nearest neighbors algorithm based on image features or using a data clustering technique for tagging the pre-synchronized image data.

11. The data receiving apparatus of claim 10, wherein the receiving unit receives reference list data including information on the reference image set used for compression of the original image data, and the decoding unit extracts the reference image set corresponding to the reference list data from the storage unit and restores the original image data using the extracted reference image set.

12. An image processing method performed by an image processing apparatus, comprising:
    selecting, as a reference image, at least one of pre-synchronized image data based on a result of comparison between the pre-synchronized image data and an original image data;
    generating a compressed image data by compressing the original image data using the reference image; and
    protecting the reference image to be used for generating the compressed image data.

13. The image processing method of claim 12, wherein in said selecting, similarity between the original image data and the pre-synchronized image data is calculated and the reference image is selected from the pre-synchronize image data based on the calculated similarity.

14. The image processing method of claim 13, wherein in said selecting, the pre-synchronized image data is classified into a plurality of reference image set candidate groups; at least one of the reference image set candidate groups is selected based on a result of comparison between the plurality of the reference image set candidate groups and the original image data; the similarity between the original image data and image data included in the selected at least one of the reference image set candidate groups is calculated; and at least one of the image data included in the selected at least one of the reference image set candidate groups is selected as the reference image based on the calculated similarity.

15. The image processing method of claim 13, wherein in said selecting, the pre-synchronized image data is classified into a plurality of reference image set candidate groups using a K-means clustering algorithm or a K-nearest neighbors algorithm based on image features, or using a data clustering technique for tagging the pre-synchronized image data.

16. The image processing method of claim 13, wherein in said selecting, the similarity between the original image data and the pre-synchronized image data is calculated using one or more techniques for calculating similarity between images among a technique for for calculating color differences between pixels at the same position in the images and determining that the smaller a sum of the color differences between the images is, the more similar the images are, a technique for calculating similarity by extracting and comparing image features including contours and color characteristics between images, a technique for calculating similarity based on cosine similarity between distribution vectors using color distribution between images, and a technique for calculating similarity based on a matching rate of bit streams between images.

17. The image processing method of claim 12, wherein in said protecting, if a deletion request event for the reference image occurs, another reference image is used by the image data compressed using the reference image whose deletion has been requested.

* * * * *